United States Patent [19]
Day

[11] 3,881,091
[45] Apr. 29, 1975

[54] CONTROL FOR INJECTION MOLDING

[76] Inventor: Charles Leon Day, 11 Main St., Wells, Maine 04090

[22] Filed: Aug. 31, 1973

[21] Appl. No.: 393,567

Related U.S. Application Data

[63] Continuation-in-part of Ser. No. 169,009, Aug. 4, 1971, abandoned, which is a continuation-in-part of Ser. No. 33,003, April 29, 1971, abandoned.

[52] U.S. Cl. ............... 219/489; 219/483; 219/486; 219/501; 219/506
[51] Int. Cl. ............................................. H05b 1/02
[58] Field of Search .......... 219/483, 486, 494, 497, 219/499, 501, 503, 506, 489

[56] References Cited
UNITED STATES PATENTS

| | | | |
|---|---|---|---|
| 3,467,817 | 9/1969 | Fricker | 219/501 |
| 3,632,986 | 1/1972 | Neer | 219/501 |
| 3,678,247 | 7/1972 | Sawa et al. | 219/501 |
| 3,775,591 | 11/1973 | Gould | 219/501 |

*Primary Examiner*—J. D. Miller
*Assistant Examiner*—Fred E. Bell
*Attorney, Agent, or Firm*—Joseph Zallen

[57] ABSTRACT

A control for heating currents in multiple cavity molds in injection molding machines. The principal features include separate modular power controls each having variable resistor means with an accessible dial for controlling current through a triac and means for avoiding high value transient voltages. Other features include a switch to provide instantaneous maximum current, means for switching from 220 to 110 volts, and lamp means for indicating operating condition.

14 Claims, 13 Drawing Figures

CONTROL FOR INJECTION MOLDING

RELATED CASE

This is a continuation-in-part of copending patent application Ser. No. 169,009 filed Aug. 4, 1971, now abandoned which in turn is a continuation-in-part of then pending but now abandoned patent application Ser. No. 33,003 filed Apr. 29, 1970.

BACKGROUND OF INVENTION

This invention relates to control devices for multiple cavity molds in injection molding machines. In particular, it relates to a high precision device for controlling heating current in such molds.

One particular type of multiple cavity mold with which this invention is concerned is the so-called "hot runner" molding system wherein a heating element is fed the proper amount of current to give the appropriate heat for the plastic in the mold. Examples of such devices are described in U.S. Pat. Nos. 3,091,812; 3,189,948; and 3,499,189. Because of the variation of the shape and size of the mold cavities, there is a significant variation in the amount of heat that each heating element should produce. This variation is also caused by the difference in the nature and melting point of the plastic molding materials. Accordingly, the user must be provided with a means for varying the current and thus the amount of heat that a particular heating element produces in the mold.

Another type of injection molding system is the so-called "cold runner" system. In this case, the plastic material is heated in the molding machine and immediately injected into the mold and held at a lower temperature (still fluid) and then reheated while it is in the cavity. Heating current is needed to maintain the heat in this cavity since the runner system, even though quite hot, is still much cooler than the material in the cavity.

Devices have been proposed in the past for controlling such multiple heating current loads. These have generally comprised the use of a bank of separate autotransformers or power rheostats. An example of such an autotransformer is General Radio Company's "Variac." Such an autotransformer useful for controlling heating current in a mold is of the order of magnitude of five amperes with a weight of about fifteen pounds per unit. The carbon brush used as the mobile contact is subject to breakage, high temperature oxidation, arcing and general brush track deterioration of the windings. Further, an autotransformer can only carry full load current at full line voltage. Although an autotransformer can be adjusted by trial and error to give the appropriate heating current for the particular mold or cavity using a particular plastic material, this setting must be changed to full current when the injection molding cycle is interrupted for any significant period of time, in order to thaw the frozen gates. Accordingly, the use of such autotransformers to control the heating currents in multiple cavity molds is unsatisfactory.

One object of the present invention is to provide a control device for heating currents in injection molding systems which is of reduced size, weight and cost.

Another object of the present invention is to provide such a control device which can be housed in a compact, relatively light enclosure.

A further object of this invention is to provide a compact bank of such control devices in easily replaceable modular form.

Further objects and advantages of this invention will be apparent from the description and claims which follow taken together with the drawings, appended hereto.

SUMMARY OF INVENTION

The control device of this invention comprises an array of separate power controls housed in a common enclosure with controls and indicators mounted on a common panel. Each of the power controls comprises a solid state, bidirectional conducting device such as a triac with integral diac for controlling current flow in two directions to the selected load. A phase shifting capacitor is provided for the triac. Each power control is preferably housed in a separate module detachably mounted in the enclosure. A variable resistor whose control dial is mounted on the panel of the enclosure permits variable heat control by varying the voltage to the capacitor.

A switch is preferably provided in the panel to short out the variable resistor and thus provide maximum current. Another switch is also usually provided in conjunction with a diode which permits changing from 110 to 220 volts as may be desired. The circuit also preferably contains a current limiting resistor, two indicator lamps and a trouble shooting indicator lamp as well as diode and resistor means to prevent a snap-on effect. An ammeter is also usually provided to give the operator direct reading of the current that is passing through the load.

One feature of this invention is the provision of means for preventing misfiring and destruction of the conducting device by high value transient voltages. Such transient voltages include lightning striking a power line, interruption of transformer magnetizing current, energizing of transformer primary, load switching, switching current with inductive load across input and energizing a stepdown transformer. Such transients are particularly significant in the application of multiple controls across a common feed, because of the resultant random triggering. In the present invention, high value transient voltages are converted to reciprocal voltages by diode means, such as a selenium recitifer designed for intermittent operation in its reverse directions, as for example, a thyrector.

In place of resistors for limiting current, capacitors can be used for the same purpose and are sometimes preferably used where there is concern about heat buildup. The indicator lamps may be neon glow lamps or incandescent lamps, the latter often being more reliable.

In addition, the invention can include a ground fault test circuit to indicate the connection of any part of the power circuit to a ground potential. Separate single-pole-double throw switches connected mechanically are used. Wiring is such that when one switch is in the normal control position, the other connects an indicator lamp directly to the output of a fuse. The indicator lamp will receive power even when the control is off. If either side of the load is grounded, the lamp will illuminate, indicating a hazard.

SPECIFIC EXAMPLE OF INVENTION

Referring now to FIGS. 1–4, there is illustrated therein a specific example of this invention designed in one compact unit to separately control the heating current for eight heating circuits, as for example, in injection molding machines. The unit comprises a case 10 having a body portion 11 attached by hinge 13 to cover 12. The case has a handle 14 and lock members 15 and 16, and in closed condition is relatively slim and compact. The body portion 11 contains the electrically functioning components. On side wall 11a are the exposed terminals of a built-in input box 21 and an output box 22. A screened air vent 18 is also provided in lower wall 11a. On the upper wall portion 11b are screened air vents 19.

Body portion 11 has a top mounting panel 17 on which the various controls and indicators are mounted. As shown in the plan view in FIGS. 1 and 1a, there are eight separate heating circuits. Control circuit strip 1 comprises an on-off switch 101, a switch 102 for shifting between 110 and 220 volts, switch 103 for shifting between a maximum current and a controlled current, dial 104 for selecting the desired amount of current, a yellow trouble shooting light 105, ammeter 106, a red indicator light 107, a fuse 108, a second red indicator light 109 and a fuse 110. Each of the other control circuits 2 to 8 have corresponding parts similarly identified by the last two digits in the numeral so that, for example, 801 corresponds with 101, 810 with 110, etc.

Figures 1, 1A:
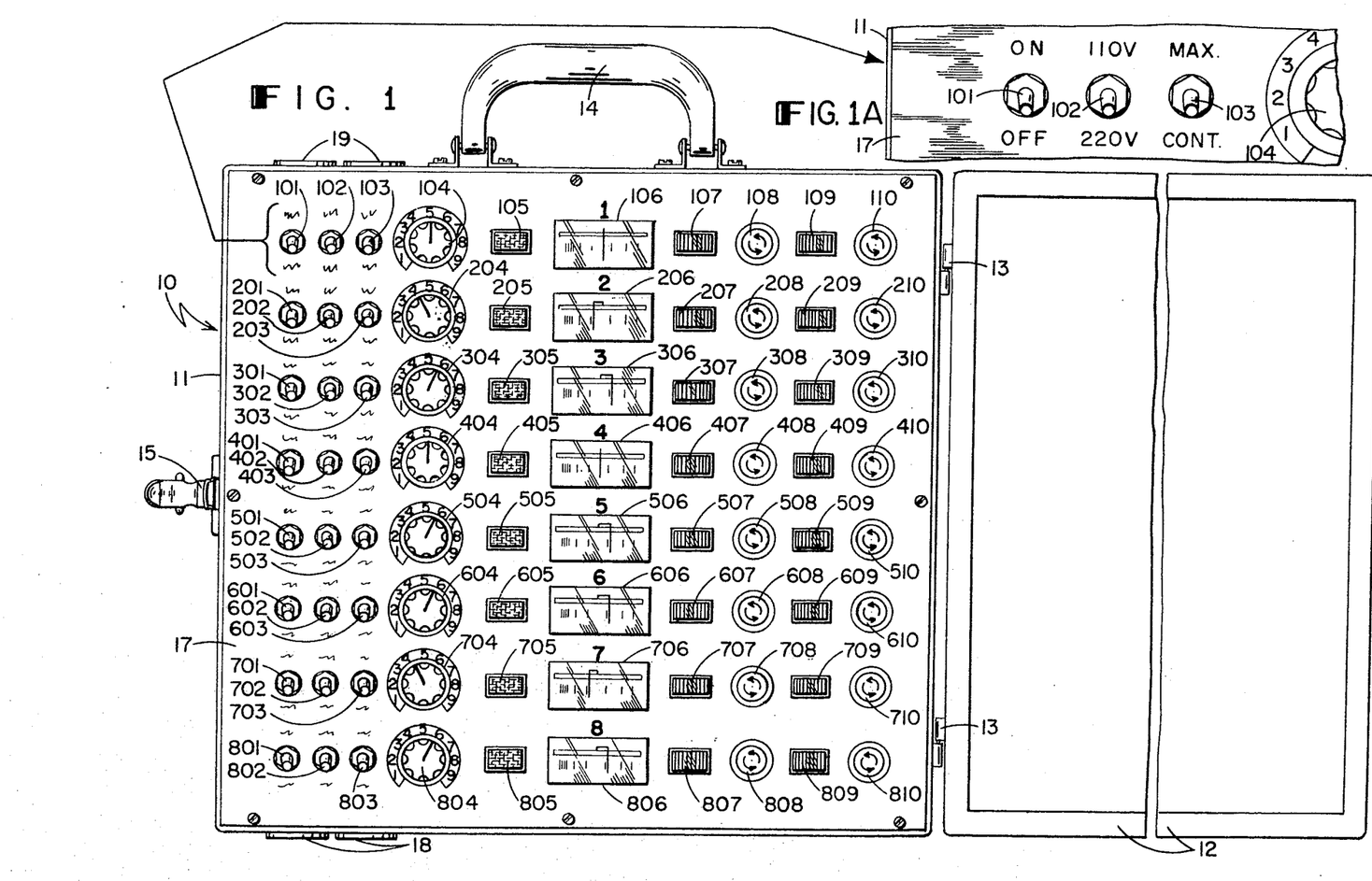
FIG. 1 is a plan view with partial breakaway of an enclosure housing eight controls of this invention, with the cover open so as to expose the various controls, light and indicators mounted on the top panel.
FIG. 1A is an enlarged view of a portion of FIG. 1.
Figure 2:
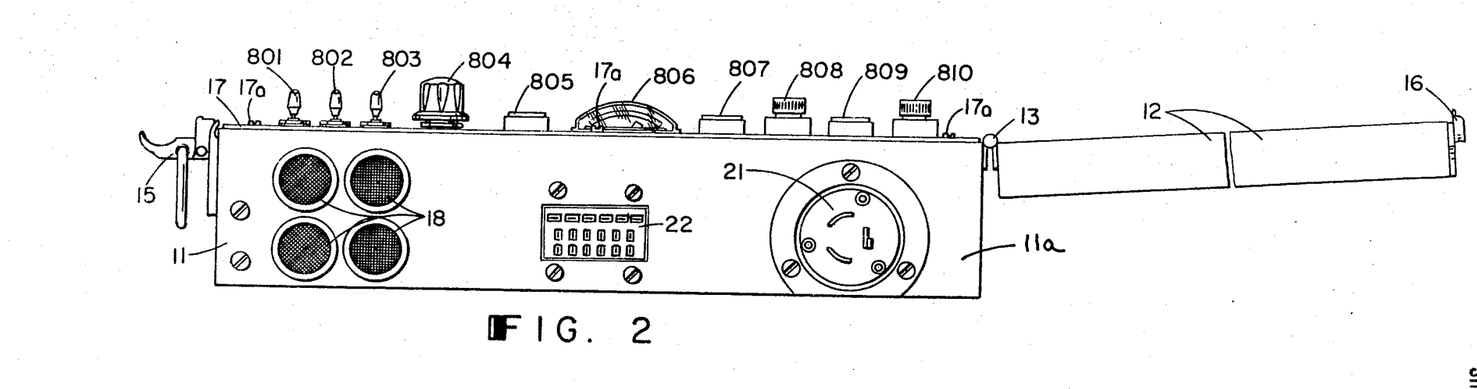
FIG. 2 is a bottom view of FIG. 1, with cover open.
Figure 3:
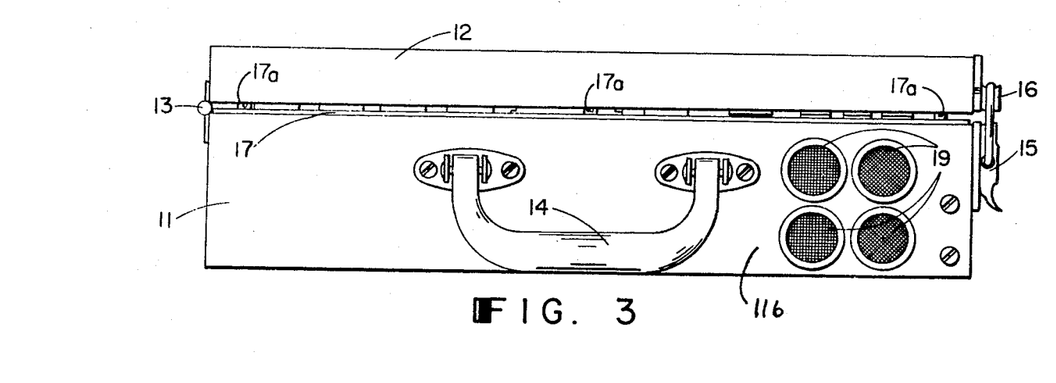
FIG. 3 is a top view of the closed enclosure of FIG. 1.
Figure 4:
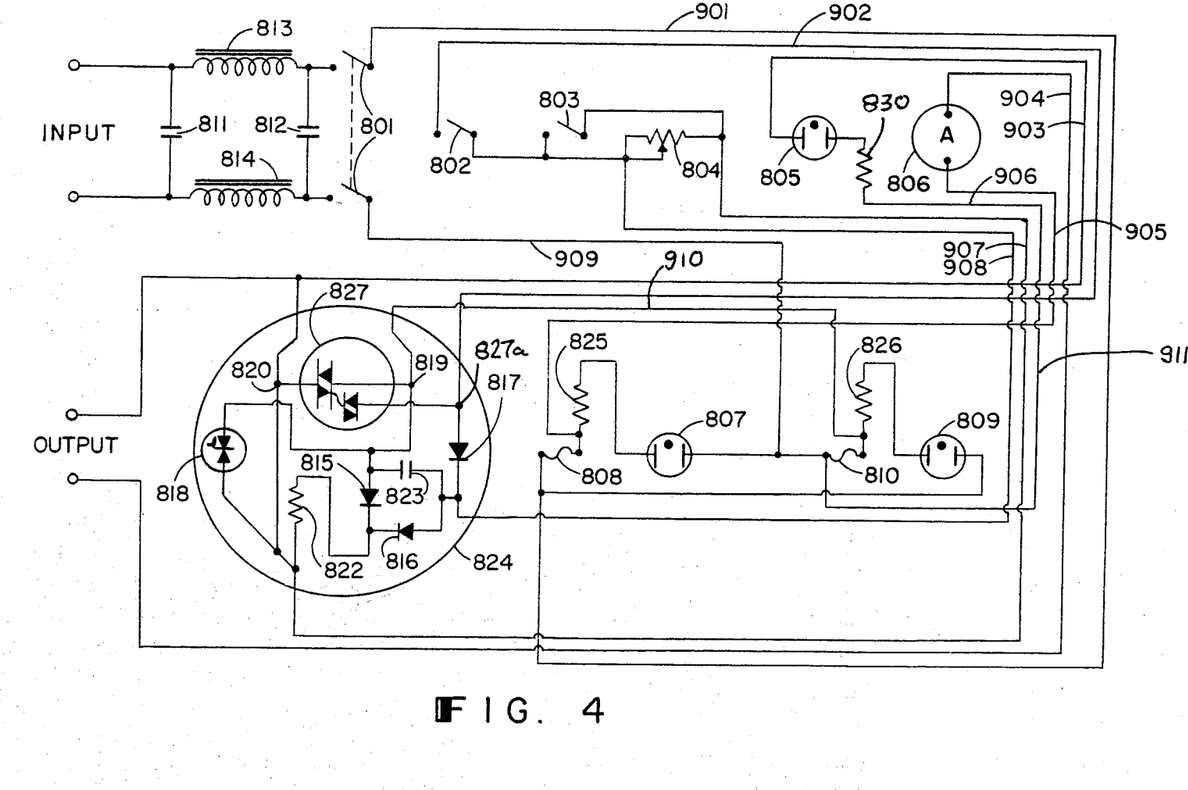
FIG. 4 is a schematic diagram of one of the power control circuits in the enclosure.
Figure 5:
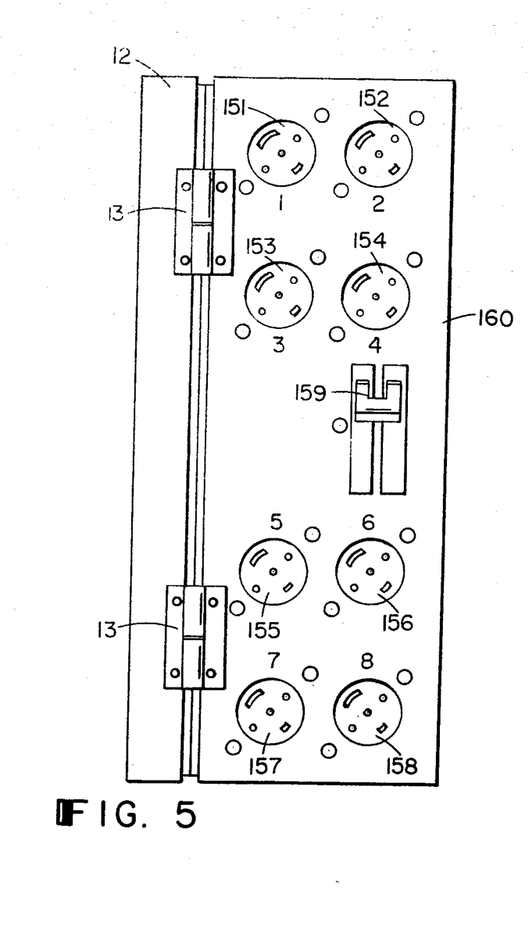
FIG. 5 is a right side view of a modification of FIG. 1, wherein the plan, bottom and top views are substantially the same, except for enclosure depth.
Figure 6:
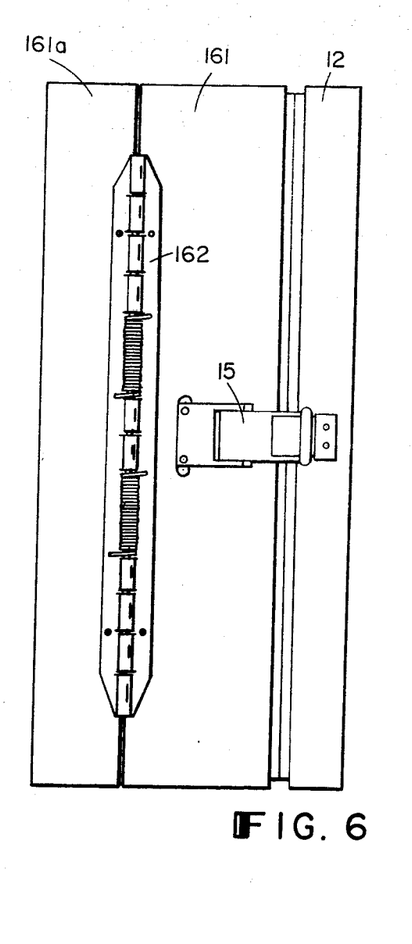
FIG. 6 is a left side view of FIG. 5, showing power control modules covered.

Each of the control concuits 1 to 8 is connected to a selected portion of the output. Since each of these circuits is substantially identical in electrical construction and function, each will be described with reference to circuit 8 as illustrated in FIGS. 2 and 4. The key component is triac 827, which contains an integral diac.

The input is connected on both sides to inductive coils 813 and 814 with capacitors 811 and 812 across the wires on both sides of the coils. On-off switch 801 is a two pole switch. From one pole runs conductor 901 to fuse 808 thence in parallel to conductor 905 to ammeter 806 then through conductor 904 back by the output; and to resistor 825, a first red light 807 back by conductor 909 to the other pole of the on-off switch 801. Current also flows from light 807 back through 909 to switch 801. The other branch is to terminal 819 of triac 827. Ahead of fuse 810 is conductor 911 which connects in series with resistor 830, yellow trouble shooting light 805, conductor 903, and splits to the output and to terminal 820 of triac 827.

Terminal 819 of triac 827 is connected to thyrector 818 whose output divides between a connection to terminal 820 and a connection to conductor 907. Conductor 907 leads on one side to series connection with resistor 822 and the output of diodes 815 and 816, and on its other side to parallel connection with switch 803, which shifts the current between maximum and controlable, and variable, control resistor 804. The path then continues from either 803 or 804 to switch 802, conductor 902 which leads to terminal 827a. Terminal 827a is the gate for triac 827 and also connects with diode 817 whose output divides between conductor 908 (which leads back to variable control resistor 804) and the circuit comprising in parallel diode 816 and phase-shifting capacitor 823 and diode 815. Between capacitor 823 and diode 815 is a connection to the conductor between terminal 819 and thyrector 818.

The inductive coils 813 and 814 and capacitors 811 and 812 are solely to lessen noise of radio frequencies that may be produced by the device. They are not needed for the operation of the invention and can be eliminated. When eliminated FIG. 4 would merely show two straight wires from the alternating current input to the terminals of switch 801.

Also, for ease of construction and maintenance, components 815, 816, 817, 818, 819, 820, 822, 823, 827 and 827a may be housed in a single replaceable plug or modular unit 824.

In the modification illustrated in FIGS. 5 to 11, the significant feature is the use of a hollow, finned metal body as the housing for components in the modular unit.

Figure 7:
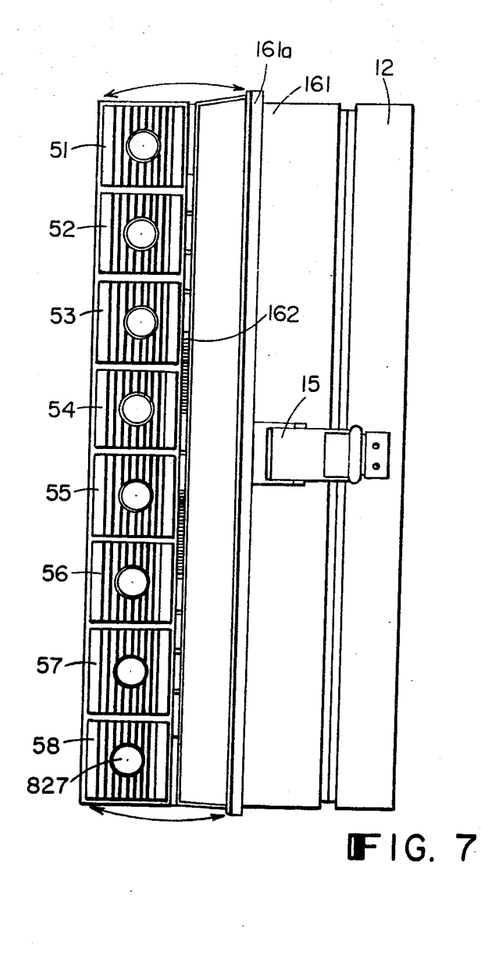
FIG. 7 is a left side view of FIG. 5, showing power control modules exposed.
Figure 8:
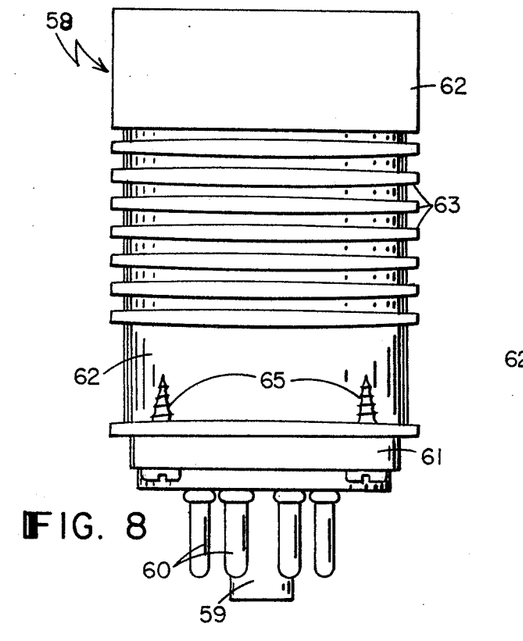
FIG. 8 is an enlarged front elevation of a power control module.
Figure 9:
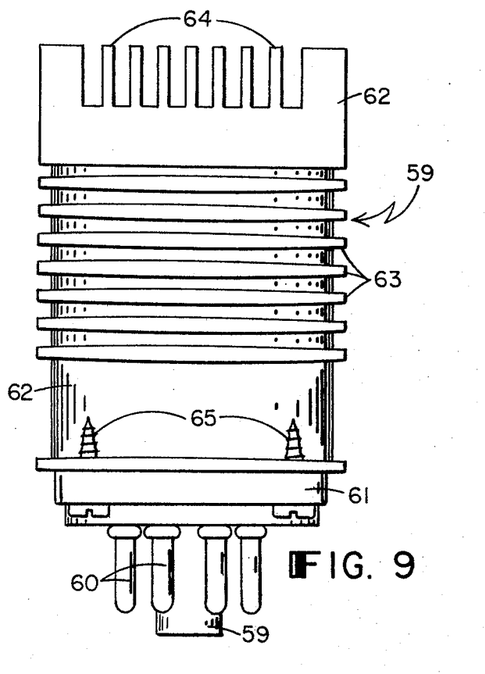
FIG. 9 is a right side elevation of FIG. 8.

The module 59, illustrated in FIGS. 8 to 11 comprises an aluminum body 62 which has a central cavity 66 extending axially. Body 62 has thin horizontal side fins 63 and thin horizontal top fins 64 as well as thick side portions 62a on top. The fins aid in radiating heat outward and the thick side portions 62a, which, as shown in FIG. 7 are in contact with the enclosure walls serve to conduct heat to the walls of the enclosure. The module 58 contains each of the principal components of the power switch circuit. It is noted, in particular, that triac 827 which produces most of the heat is spaced across the opening to cavity 66 at the top. Because of the heat conducting and radiating ability of the module very high current loads can be used, as, for example, 20 amperes.

Each module has an insulating base 61 and has its components wired to pins 60. The modules 51–58 are fitted into a compartment (FIG. 7) where each module fits into a separate socket (not illustrated) connecting to the source of power and to one set of controls. The modules are covered by panel 161a which connects by hinge 162 to wall 161.

On wall 160 separate optional outlets 151–158 are provided as well as main circuit-breaker 159. Ventilation of the modules is provided by vents 18 and 19 (See FIGS. 2 and 3).

In analyzing the major power switching circuit, we can assume that an unidirectional current is applied to 813 side of switch 801 and consequently, current flows through switch 801 (switch closed), through wire 901 to fuse 808. Leaving fuse 808, current direction is through wire 905 to ammeter 806 and wire 904 to a load across the output. Current flows from the load to terminal 820 of triac 827. Upon leaving the triac 827 through 819, current flows through fuse 810, conductor 909, to switch 801 (switch closed), and back through the L-C filter network 811–814, limiting the instantaneous upsurge and fall of load current. Capacitors 811 and 812 shunt radio frequency interference.

The control circuit is fed from terminal 820 of triac 827. Current enters manually variable control resistor 804 which further limits to a variable amount the current charging capacitor 823. When capacitor 823 is charged to a predetermined voltage triac 827 fires. With capacitor 823 and variable control resistor 804 at proper values, the firing angle of triac 827 may be varied from 0° through to 180° for each half cycle, thus varying the conduction angle from 180° through to 0°, resulting in full and complete control. To prevent marring of control smoothness by an undesirable snap-on-effect, diodes 815 and 816 and resistor 822 are provided. During the positive half cycle, both diodes 815 and 816 are reverse-biased and capacitor 823 charges through resistor 804 to a positive voltage. When the positive supply voltage becomes less than the charge on capacitor 823, it discharges through diode 815 and resistor 822, and resets capacitor 823. After the line voltage crosses zero and becomes negative, diode 816 conducts and the capacitor 823 then charges to the negative voltage. No resetting is obtained at the end of the negative half cycle; however, the snap on effect is reduced to an insignificant level, producing a smooth and continuous control.

Another feature of this invention is the "lockin" achieved by the use of diode 817 and a simple shorting switch 802. With the switch 802 off, diode 817 limits trigger voltage to a negative pulse and only on the negative half cycle, thus limiting voltage to ½ E.

A further feature of this invention is "max on" which is achieved like lockin by the use of a shorting switch 803. When switch 803 is closed, resistor 804 is shorted out, instantly reducing the firing angle of triac 827 to 0° and increasing the load (heater) current to maximum. Ability to do this without disturbing delicate control adjustments, which may be easily returned to by opening the switch, is highly desirable in thawing singular frozen gates, or on Monday morning warm ups in injection molding machines.

Indicator lights 807 and 809 are fired by fuses 808 and 810 respectively, provided fuses 808 and 810 are intact. Current flows, illuminating each light, and is limited by current limiting resistors 825 and 826. Indicator 805 is connected in series with current limiting resistor 830 across triac 827. When triac 827 is triggered late, indicator 805 attempts to carry the load, glowing "brillantly." However, if the triac is triggered early, it effectively short-circuits the feed to light 805, turning it off. It can be easily seen that this shorted condition may vary under control from an insignificant level to a low impedance dead short. This operates indicator light 805 inversely proportionally to triac 827. 805 thus shows the variation in operating condition of the device.

It should be noted that the indicator light 805 will show the load condition and that switch 803 permits instant maximum power without altering the values of variable resistor 804 which can be preset to give the desired amount of heating current. The control dial which operates resistor 804 can be monitored at all times by reading the meter 806. Because of utter simplicity of arrangement of controls, the skills required are easily learned by untrained personnel. When tested for reliability and control of multiple heatloads, in particular heating multiple cavity molds used in injection molding, the above described example of this invention was found to be reliable and to provide high precision control. The unit is far smaller, much lighter and far cheaper than an auto transformer of comparable electrical size. Thus, the unit illustrated in the drawings has a weight of about 10 pounds and occupies less than one half a cubic foot of space.

Thyrector 818 which is across triac 827 draws negligible current below its rated recurrent peak voltage. However, above rated recurrent peak voltage thyrector 818 draws a rapidly increasing amount of current and dissipates the excess energy, restraining its propagation to other circuit elements. As the transient or generated spike is dissipated within the thyrector and the voltage drops to a nominal recurrent level, the resistance of thyrector 818 increases rapidly and it ceases to conduct. Thyrector 818 is selected to limit transient and generated spike voltages to about 150 to 200 percent of the recurrent peak voltage.

Figure 10:
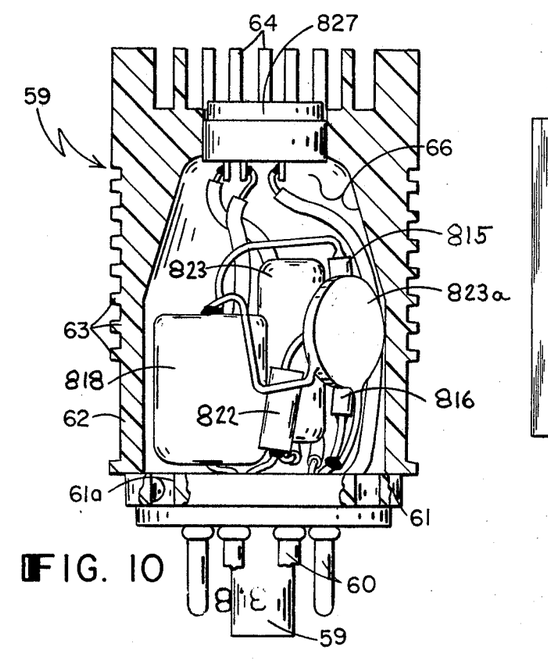
FIG. 10 is a central vertical section of FIG. 9 with partial breakaway.
Figure 11:
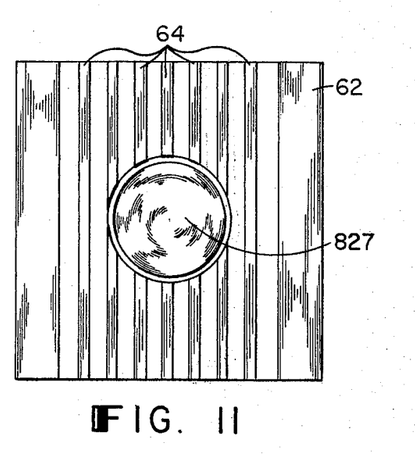
FIG. 11 is a top view of FIG. 8.

In FIG. 10, capacitor 823a is merely additional capacitance in parallel with 823.

Each module 51 to 58 contains all the components normally subject to failure. Thus, each circuit can be instantly repaired by simply replacing the module.

The components in the module are preferably sealed by injecting a potting compound such as polyester resin. This seals the components from air, corrosive atmosphere, moisture, explosive gases and the like and renders it shock resistant.

This module with its encased components has a separate special utility, apart from its use with a variable resistance. It can be used as a safe, on-off switch in an explosive atmosphere.

Figure 12:
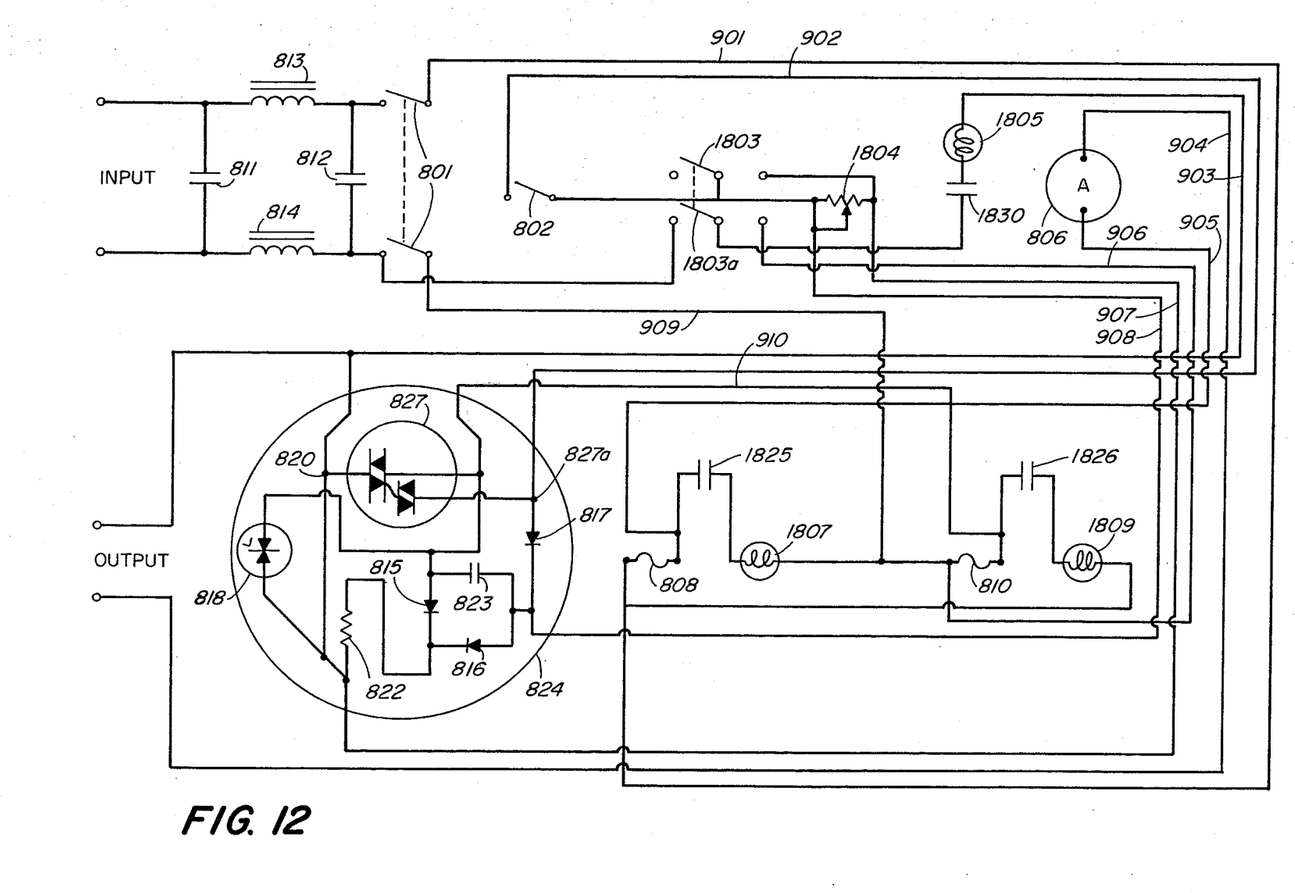
FIG. 12 is a schematic diagram of the circuit of a variation of the power control illustrated in FIG. 4.

The power switch illustrated in FIG. 12 incorporates a ground fault test circuit, utilizes capacitors 1825, 1826 and 1830 in place of resistors 825, 826 and 830 and utilizes incandescent lamps 1805, 1807 and 1809 in place of neon lamps 805, 807 and 809. In place of switch 803 a pair of switches 1803 and 1803a are provided. These are separate single-pole-double throw switches connected mechanically. Switch 1803 connects alternately to a blank terminal or to wire 907. Switch 1803a connects either to the input (1814) or to wire 1906 (which replaces 906) and is always connected to capacitor 1830.

Indicator lamp 1805 receives power even though the control is off. Accordingly, if either side of the load is connected to ground, usually by accident, lamp 1805 illuminates, indicating a hazard. By mechanically coupling switches 801 and 1803a, the ground fault feature is automatic.

It should be noted that irrespective of whether there is a ground fault circuit, indicator lamp 805 or 1805 will show continuity of the entire circuit or failure of continuity. Also, the indicator lamp, by flashing or flickering, would suggest instability of some component.

I claim:

1. A control device of high precision for use in controlling high current loads, as for example, heating currents for multiple cavity molds in injection molding machines, comprising in a compact enclosure a separate power control for each load, each such control comprising:
   a. a solid state, bidirectional conducting device (827) for controlling current flow in two directions through a load;
   b. phase-shifting capacitor means (823) connected in parallel to said conducting device (827);
   c. variable resistor means (804) connected in parallel to said conducting device (827) and in series with said capacitor means (823);
   d. diode means (818) connected across said conducting device (827) for passing high value transient voltages to reciprocal voltages, and
   e. switch means (1803) to short out said variable resistor means (804) and provide maximum current through said conducting device (827).

2. The control of claim 1 which includes diode (815,816) and resistor means (822) to prevent a snap-on effect.

3. The control of claim 1 which includes switch means (802) and diode means (817) for limiting trigger voltage to one-half the applied voltage.

4. The control of claim 1 which includes current limiting resistor means (830) and indicator lamp means (805) in series across conducting device (827), so that lamp means (805) shows the operating condition.

5. The control device of claim 1 wherein the enclosure has recesses and modules detachably mounted in said recesses; each said module containing components (a), (b) and (d) of claim 1 of a separate control, components (c) and (e) being separately mounted in the enclosure.

6. The control device of claim 5 wherein each control has switch means (802) and diode means (817) for limiting trigger voltage to one-half applied voltage.

7. The control device of claim 5 wherein each control has diode (815,816) and resistor means (822) located in a said module to prevent a snap-on effect.

8. The control device of claim 5 wherein each control has limiting resistor means (830) and indicator lamp means (805) located in said enclosure in series across said conducting device (827) so that lamp means (805) glows brilliantly if conducting device (827) is triggered late but is turned off if conducting device (827) is triggered early thus being a visual indicator of the operating condition.

9. The control device of claim 5 wherein said module has a hollow metal body (62) with fins (63,64).

10. The control device of claim 5 wherein said module has a hollow metal body (62) with fins and a conducting surface (62a).

11. The control device of claim 5 wherein said module is detachably mounted by pin (60) and socket means.

12. A power control module adapted for use with a variable resistor to produce a variable high current in a high current load, as for example, a heating circuit for a mold used in injection molding, comprising a hollow, metal body (62) having detachable mounting means (60) and containing encased within said body:
   a. a solid state, bidirectional conducting device (827) for controlling current flow in two directions through a load;
   b. phase-shifting capacitor means (823) connected in parallel to said conducting device (827); and
   c. diode means (181) connected across said conducting device (827) for passing high value transient voltages to reciprocal voltages; said components being sealed from the atmosphere with a potting compound.

13. The module of claim 12 wherein the body (62) has fins (63,64).

14. The module of claim 12 wherein the body (62) has a flat conducting portion (629).

* * * * *